United States Patent
Shanmugavelayudam et al.

(10) Patent No.: US 9,027,782 B1
(45) Date of Patent: May 12, 2015

(54) COMPOSITE MATERIAL BASED INSULATED SHIPPING CONTAINER

(71) Applicant: MaxQ, LLC, Stillwater, OK (US)

(72) Inventors: Saravan Kumar Shanmugavelayudam, Stillwater, OK (US); Balaji Jayakumar, Stillwater, OK (US); Shoaib Shaikh, Stillwater, OK (US); Jessica Shelton, Stillwater, OK (US)

(73) Assignee: MaxQ, LLC, Stillwater, OK (US)

( * ) Notice: Subject to any disclaimer, the term of this patent is extended or adjusted under 35 U.S.C. 154(b) by 0 days.

(21) Appl. No.: 14/080,127

(22) Filed: Nov. 14, 2013

Related U.S. Application Data

(60) Provisional application No. 61/726,334, filed on Nov. 14, 2012.

(51) Int. Cl.
| | |
|---|---|
| *B65D 81/38* | (2006.01) |
| *B32B 5/02* | (2006.01) |
| *B32B 5/18* | (2006.01) |
| *B32B 3/12* | (2006.01) |
| *B29C 70/02* | (2006.01) |
| *B29C 45/14* | (2006.01) |

(52) U.S. Cl.
CPC ............ *B65D 81/3886* (2013.01); *B32B 5/024* (2013.01); *B32B 5/18* (2013.01); *B32B 3/12* (2013.01); *B32B 5/022* (2013.01); *B29C 70/021* (2013.01); *B29C 2045/1486* (2013.01); *B29C 2791/007* (2013.01)

(58) Field of Classification Search
CPC ........... B65D 81/3858; B65D 81/3848; B65D 81/38; B65D 81/3897; B65D 81/3888; B65D 25/14; B65D 5/60; B65D 5/56; B65D 11/1833; B65D 11/18; F25D 23/066; F25D 23/065; F25D 23/06; B32B 27/10; B32B 27/08; B32B 27/06; B32B 27/00
USPC ........ 220/592.24, 592.26, 592.2, 4.28, 62.22, 220/62.19, 62.11, 6; 428/36.2, 36.1, 35.7, 428/34.1
See application file for complete search history.

(56) References Cited

U.S. PATENT DOCUMENTS

| | | | | |
|---|---|---|---|---|
| 2,482,499 | A * | 9/1949 | Nagel | 442/117 |
| 4,091,852 | A * | 5/1978 | Jordan et al. | 383/3 |
| 5,857,778 | A * | 1/1999 | Ells | 383/5 |
| 6,027,249 | A * | 2/2000 | Bielinski | 383/110 |
| 6,048,099 | A * | 4/2000 | Muffett et al. | 383/20 |
| 2007/0000932 | A1* | 1/2007 | Cron et al. | 220/592.24 |

* cited by examiner

*Primary Examiner* — Robert J Hicks
(74) *Attorney, Agent, or Firm* — GableGotwals

(57) ABSTRACT

A sandwich composite material for use in an insulated shipping container includes two different central (core) materials sandwiched between an inner and an outer skin material. The core contains a low density, high compressive strength cellular material and a low density, low thermal conductivity insulation fabric material. The inner and outer skin layers increase the overall flexural rigidity of the composite material. The sandwich composite material can be made into flat sheets of required size and integrated into a fabric sleeve to form the container. Alternatively, the sandwich composite material can be molded as the container to achieve uniform and continuous insulation and structural support.

10 Claims, 3 Drawing Sheets

COMPOSITE MATERIAL BASED INSULATED SHIPPING CONTAINER

CROSS-REFERENCE TO PENDING APPLICATIONS

This application claims priority to U.S. Prov. Pat. Appl. Ser. No. 61/726,334, filed Nov. 14, 2012.

BACKGROUND OF THE INVENTION

The present invention relates to a sandwich composite having a high insulation capacity and the ability to withstand high impact loads. More particularly, the present invention relates to a sandwich composite material composition that can be used to insulate shipping containers used for transporting temperature sensitive products.

Insulated shipping containers are used to ship temperature sensitive products such as pharmaceuticals, food and chemicals. The shipped product or payload must be maintained within a predetermined temperature range during transport. The insulation material used for the container dictates the duration of time in which the payload can remain within a predetermined temperature range. The structural component (usually an outer shell) of the container protects the payload from damage and maintains integrity of the insulation material from any physical impact.

The industry standard package design includes sheets of insulation material that are placed inside a corrugated cardboard container. The most commonly used insulation materials are expanded polystyrene (EPS) and polyurethane (PUR). The insulation materials are typically two to three inches thick and, because of this, limit the amount of volume available for payload, thereby increasing the number of containers needed and overall packaging cost. If the insulation material can be made thinner without compromising the insulation capacity, the usable volume of the container increases and the overall efficiency of the packaging solution improves. Further, insulation materials that have improved load bearing capacity can negate the need for additional structural support and can provide flexibility in container design.

The insulation material, by virtue of its low heat transfer capacity, reduces the rate at which the payload gains heat from the surrounding environment. The lower the thermal conductivity of the insulation material, the longer the container can hold the payload in the predetermined temperature range. The thermal conductivity of EPS and PUR is in the range of 30-40 mW/mK. To increase temperature hold time, temperature sensitive payloads are typically packed with other cooling materials like wet ice, dry ice or phase change materials. The cooling materials work in tandem with the insulation, absorbing the excess heat which enters the container and helping maintain the payload temperature within the predetermined temperature range.

The major drawback with the use of cooling materials is that the materials increase the dead weight of the package. Therefore, a low thermal conductivity insulation material can significantly lower the amount of cooling materials needed to protect the payload. With their limited insulation capacity, both EPS- and PUR-insulated containers have a payload temperature hold time of about forty-eight hours. A container with a better insulation rating will prolong the temperature hold time for the payload, reduce the amount of cooling material required, and improve the overall efficiency of the packaging solution.

Further, because EPS and PUR have a porous microstructure, each material has very low compressive strength and bending stiffness. And due to their fragile nature, the insulation materials are easily prone to physical damage which further reduces insulation capacity. Low compressive strength and bending stiffness, and overall fragility, limits the formability and application of these materials. Additionally, the existing design of EPS- and PUR-insulated containers is not durable and limits the reusability of the container solution for a new payload.

Therefore, a need exists for a thin, lightweight, high impact resistant insulation material that can be formed into a highly durable multi-use shipping container for efficient and safe transportation of temperature sensitive payloads.

SUMMARY OF INVENTION

A sandwich composite material made according to this invention includes two different central (core) materials sandwiched between an inner and an outer skin material. The core contains a low density, high compressive strength cellular material. Use of a cellular material reduces overall weight of the composite while improving the specific compressive strength and bending stiffness of the overall sandwich composite material. The core also contains a low density, low thermal conductivity insulation fabric material.

The inner and the outer skin layers are made of one or more layers of woven non-metallic fibers. In a preferred embodiment, the skin layers are a glass, carbon and KEVLAR® synthetic fiber (E. I. du Pont de Nemours and Company, Wilmington, Del.) or their equivalents. The skin layers increase the overall flexural rigidity of the composite material.

Multiple layers of the composite are combined under controlled temperature and held together by a polymeric thermoset resin system. Moreover, the thickness (preferably 5-30 mm (about 0.2 to 1.2 inches)) of the insulation fabric material is varied to achieve different insulation ratings.

The present invention also relates to two different insulated shipping container designs which make use of the sandwich composite material and methods of manufacturing those designs. The sandwich composite material can be made into flat sheets of required size and integrated into a fabric sleeve to form a container. Alternatively, the sandwich composite material can be molded as a container to achieve uniform and continuous insulation and structural support.

ELEMENTS AND NUMBERING USED IN THE DRAWINGS AND DETAILED DESCRIPTION

Figure 1:
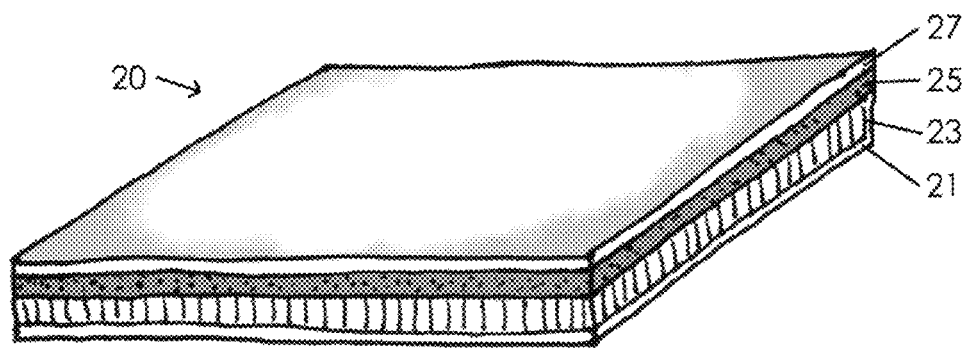
FIG. 1 is a sketch showing the inner and outer skin layers and the two core materials of a preferred embodiment of the sandwich composite material. The skin layers and core materials form a composite panel (see FIGS. 2 & 3).

10 Container
20 Wall panel

21 Inner skin layer
23 Structural core layer
25 Insulating core layer
27 Outer skin layer
30 Outer shell
31 Pocket or sleeve
33 Fasteners
35 Inner sleeve

DETAILED DESCRIPTION OF THE PREFERRED EMBODIMENTS

Figure 2:
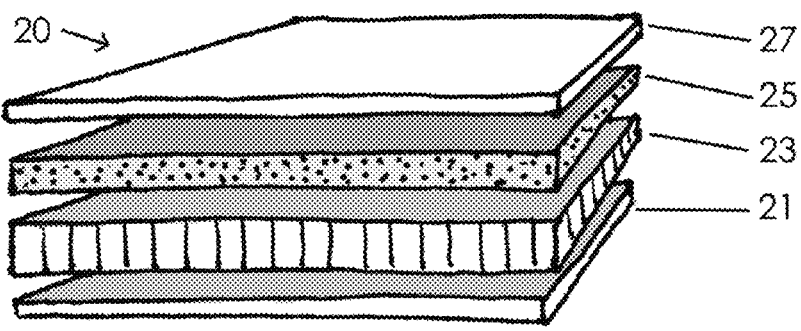
FIG. 2 is a sketch showing the composite panel formed by the cured sandwich composite material of FIG. 1.
Figure 3:
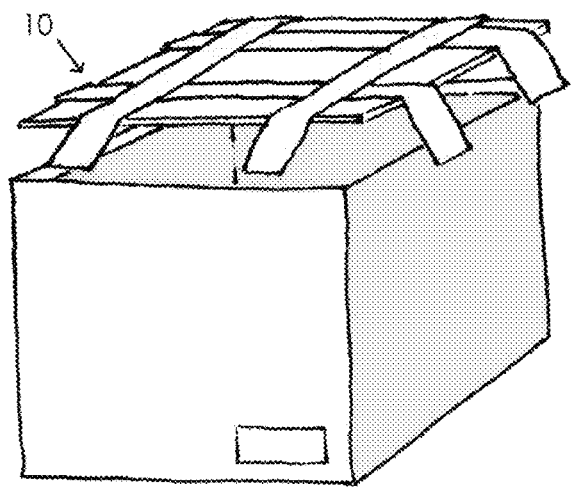
FIG. 3 is a sketch showing the outside view of a molded container comprised of the composite panels of FIG. 2.

Referring to FIGS. 1-3, a container 10 is formed using a wall panel 20, which is preferably a multi-layer composite panel 20 that is preferably at least 0.4 inches (1.016 cm) thick and has at least two functionally different core materials 23, 25 surrounded or encased by an inner and outer skin layer 21, 27. The outer and the inner skin layers 21, 27 are preferably made of one or more layers of woven non-metallic fibers such as glass/carbon/KEVLAR fiber material or their equivalent. The first core material 23 is a structurally rigid material that can withstand high impact loads. Core material 10 can be a polymeric closed cell foam material or a non-metallic honeycomb material. The second core material 25 is an insulation fabric material. In one embodiment, core material 25 is a non-woven fibrous blanket infiltrated with silica nanoparticles.

The layers 21, 27 and core materials 23, 25 are stacked in a mold and fused together using a polymeric resin at an elevated temperature. Unlike the prior art, the composite panel 20 is bi-functional, providing insulation and structural support. In one preferred embodiment, panel 20, or its core materials 23, 25, has a density in a range of 3-5 lbs/ft$^3$ (about 48 to 80 kg/m$^3$). The panel 20 or its core material 23 preferably has a compressive strength greater than 100 psi (690 KPa). The core material 25 preferably has a thermal conductivity in a range of 10-14 mW/mK at 75° F. (23.9° C.).

Because composite panel 20 is made of moldable materials (e.g., fiberglass, insulation fabric, and resin), the panel 20 can be formed into any desired shape in a single step. As a result, the size and shape of the panels 20, and the resulting insulated container 10, may be customized for each application. Additionally, container 10 provides continuous insulation around the edges, thereby providing longer payload temperature hold duration and more uniform cooling than the prior art containers. In one preferred embodiment, container 10 can maintain payloads within a temperature range of 2-8° C. (35.6-46.4° F.) for approximately 48-72 hours, nearly twice as much as the prior art EPS- and PUR-insulated containers.

A method of fabricating panel 20 includes the steps of (i) stacking the inner skin layer 21, the structural core material 23, the insulation core material 25, and the outer skin layer 27 into a stacked preform; and (ii) fusing the stacked preform under an elevated temperature in a range of 200-350° F. (93.3-176.7° C.). One or more skin layers 21, 27 may be used on either side of the stacked perform. The produced composite material 10 can be machined or cut into required sizes of panels 20 based on user or application requirements. Preferably, the minimum thickness of the composite material 10 produced is at least 0.4 inches (1.016 cm).

The stacked perform may be arranged and cured on a flat mold, on a mold having contours with curved edges, within a mold cavity having a parallelepiped container shape or within a mold cavity having a non-parallelepiped container shape.

Prior to fusing, an epoxy, polyester, or vinylester liquid resin may be injected into the stacked perform. The skin layers 21, 27 may be pre-impregnated prior to step (i) with at least one of the resins mentioned above. Additionally, the structural and insulation core materials 23, 25 may be bonded together separately, before applying the skin layers 21, 17

Figure 4:
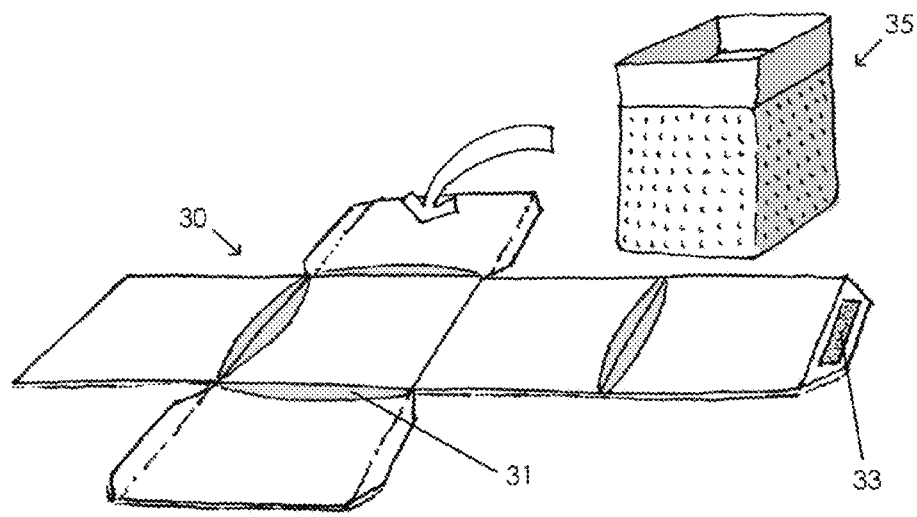
FIG. 4 is a sketch showing the interior of a preferred embodiment of a collapsible container when in its collapsed state. The sides, top, and bottom of the collapsible container include pockets to hold the composite panels of FIG. 2.
Figure 5:
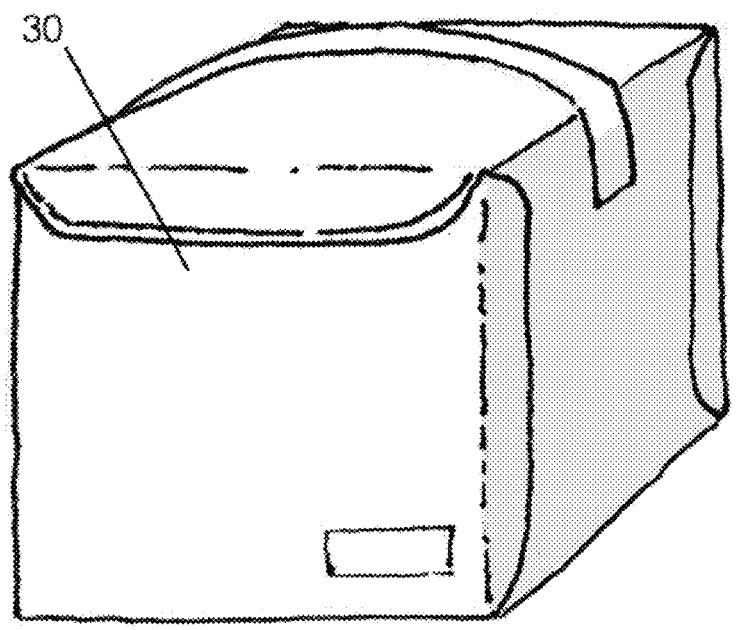
FIG. 5 is a sketch of the collapsible container in its uncollapsed, assembled form along with an inner protective sleeve. The front side of the container includes fasteners for securing the payload.

Referring to FIGS. 4 & 5, container 10 may be a collapsible container that incorporates composite panels 20 into a pocket or sleeve 31 of the container. The outer shell 30 of the collapsible container 10 may be made of any material well known in the art, such as but not including plastic, cardboard, fabric sleeve, or paperboard. The sides, top, and bottom of the collapsible container 10 may each have a pocket or sleeve 31 that receives one or more composite panels 20. Once the panels 20 have been placed within the sleeves 31, the collapsible container 10 may be folded into its final shape and secured using fasteners 33. Fasteners 33 may be any type of fastener preferable, including magnetic locks.

The collapsible container 10, in its final configuration, may also contain an inner sleeve 35 that is moisture resistant, sterile, or both moisture resistant and sterile. The container 10 can be collapsed into a flat sheet when not in use. The major advantage of this design is a significant reduction in storage space when the container 10 is not in use.

Both the molded and collapsible embodiments of container 10 are passive because each is designed to insulate container 10 and maintain a temperature of the payload without the use of an external energy source. The container 10 is packed with heat absorbing cooling materials such as, but not limited to wet ice, dry ice, and gel packs (not shown) to ensure safety of the payload. The amount of cooling material packed in container 10 determines the shipping duration for the payload.

While preferred embodiments of a composite panel and an insulated container have been described, a person of ordinary skill in the art understands that certain changes can be made in the details of construction. The invention itself is defined by the following claims, including elements which are equivalent to those specifically listed in the claims.

What is claimed:

1. An insulated shipping container comprising:
   a plurality of wall panels; and
   a continuous fabric outer shell housing each wall panel in the plurality;
   each wall panel comprising
   a non-metallic polymer-based composite having a compressive strength of at least 100 psi (690 kPa) and
   a thermal conductivity in a range of 10-14 mW/mK at 75° F. (23.9° C.);
   the insulated shipping container being deployable between a collapsed state when not in use and an uncollapsed state when in use.

2. An insulated shipping container according to claim 1 wherein the continuous fabric outer shell is made of polyester-based, non-porous, water impermeable, dust resistant, washable material.

3. An insulated shipping container according to claim 1 wherein each wall panel is bonded directly to the continuous fabric outer shell.

4. An insulated shipping container according to claim 1 wherein the continuous fabric outer shell includes at least one pocket, a wall panel being housed inside the pocket.

5. An insulated shipping container according to claim 1 wherein the continuous fabric outer shell includes at least one fastener or magnetic lock.

6. An insulated shipping container according to claim 1 wherein in the collapsed state the container is a flat sheet.

7. An insulated shipping container according to claim 1 further comprising the wall panel including at least one of an inner skin layer and an outer skin layer.

8. An insulated shipping container according to claim 1 wherein each wall panel in the plurality has a density of 3-5 lbs/ft$^3$ (about 48 to 80 kg/m$^3$).

9. An insulated shipping container according to claim 1 further comprising the insulated shipping container housing an inner sleeve.

10. An insulated shipping container according to claim 9 wherein the inner sleeve is at least one of moisture resistant and sterile.

\* \* \* \* \*